United States Patent [19]
Demarey

[11] Patent Number: 5,039,762
[45] Date of Patent: Aug. 13, 1991

[54] HYBRID AMINO RESIN COMPOSITIONS

[75] Inventor: David W. Demarey, Westhampton, Mass.

[73] Assignee: Monsanto Company, St. Louis, Mo.

[21] Appl. No.: 301,207

[22] Filed: Jan. 24, 1989

[51] Int. Cl.$^5$ .................. C08G 12/02; C08G 12/32; C08L 61/20; C08L 61/28

[52] U.S. Cl. .................. 525/509; 525/423; 525/30; 525/58; 525/162; 525/184; 525/155; 525/157; 525/518; 525/519; 528/230; 528/246

[58] Field of Search .............. 525/7.3, 30, 158, 509, 525/518; 528/246, 248

[56] References Cited

U.S. PATENT DOCUMENTS

| | | | |
|---|---|---|---|
| 3,020,255 | 2/1962 | Magrane | 525/518 |
| 3,544,489 | 12/1970 | Dowbenko et al. | 260/2.5 |
| 3,899,611 | 8/1975 | Hall | 525/509 |
| 3,979,478 | 9/1976 | Gallacher | 260/850 |
| 4,049,634 | 9/1977 | Ko et al. | 260/75 |
| 4,140,605 | 2/1979 | Sano et al. | 525/518 |
| 4,276,212 | 6/1981 | Khanna et al. | 525/509 |
| 4,520,184 | 5/1985 | Van Eenam | 526/320 |
| 4,847,366 | 7/1989 | Gerhardt | 525/518 |

FOREIGN PATENT DOCUMENTS 2030992 9/1979 United Kingdom .
2097409 4/1982 United Kingdom .

Primary Examiner—Melvyn I. Marquis
Assistant Examiner—W. R. H. Clark
Attorney, Agent, or Firm—R. Bruce Blance; William J. Farrington; Richard H. Shear

[57] ABSTRACT

Hybrid curable compositions comprising components curable by condensation and components curable by the free radical initiated polymerization. The components curable by condensation reaction comprise amino resins and co-reactants, the condensation reaction being optionally catalyzed by acid catalysts. The components curable by free radical initiated polymerization comprise acryloyl compounds.

21 Claims, No Drawings

HYBRID AMINO RESIN COMPOSITIONS

This invention relates to hybrid curable or thermosettable compositions and more particularly it relates to curable compositions comprising amino resins, co-reactants for such resins and (meth)-acryloyl unsaturated compounds and to the cured products obtained therefrom.

Curable compositions comprising amino resins and functional co-reactants have been used for many years in a variety of bonding and coating applications. In recent years high solids systems have been developed to avoid excessive solvent emissions upon application of the curable compositions to appropriate substrates. However the viscosity of the amino resin co-reactant mixture has generally limited the solids content to not more than 70 weight percent. Upon removal of solvent and curing of the compositions, coatings are obtained which possess high gloss and satisfactory QUV resistance and condensing humidity resistance. However, they are susceptible to "environmental etch" or discoloration caused by acidic organic depositions upon the surface. Curable compositions comprising (meth)-acryloyl unsaturated compounds are used extensively in radiation curable systems for surface coatings and in anaerobic systems for bonding applications. Such compositions, when they are used as surface coatings, can provide a high degree of hardness, gloss and resistance to environmental etch. However, because the amino resin/functional co-reactant is cured by an ionic mechanism, while the (meth)-acryloyl component is cured by a free radical mechanism, the two curable systems have generally been regarded as incompatible.

The present invention is directed to a hybrid of these two curable systems to obtain the advantage of higher solids content in comparison with the amino resin/functional co-reactant system. Surprisingly, the cure of the acryloyl component is not inhibited by the presence of the amino systems and the hybrid systems provide coatings which possess a high degree of gloss, distinctness of image, and resistance to environmental effects.

The present invention is a curable composition comprising an alkoxymethyl amino resin component, a functional component co-reactive with the alkoxymethyl amino resin and a (meth)-acryloyl component. Another aspect of the invention is directed to the cured compositions obtained from the curable compositions. The alkoxymethyl amino resin is selected from any of the class of those amino resins conventionally used for crosslinking functional co-reactants in which the functional groups are hydroxy, carboxy, activated methylene and the like. The (meth)-acryloyl component may be a (meth)-acryloyl monomer but more preferably it is an oligomer containing at least two (meth)-acryloyl groups per molecule. The hybrid system may be cured by the application of heat, the reaction of the amino resin and the functional component being optionally catalyzed by an acid catalyst and the polymerization of the (meth)-acryloyl component being optionally initiated with a free radical generating compound. Optionally for enhanced compatibility of the components of the curable composition, components with dual functionality may be included in the curable composition. For example components containing functional groups co-reactive with the alkoxymethyl groups of the amino resin and (meth)-acryloyl groups may be included and similarly groups comprising alkoxymethylamino groups and (meth)-acryloyl groups may be included. While a broad compositional range is contemplated in the formulation of the curable composition of the present invention, it is limited by the requirement that the components provide a compatible system as hereinafter defined.

THE AMINO RESIN

As used in this description the term "alkoxymethyl amino resin" refers to any of the large number of alkoxylated amino resins which are commonly employed for crosslinking functional resins such as hydroxy functional resins. Such amino resins are characterized as being soluble in common solvents as distinguished from amino resins of the thermosetting type which are employed in molding or casting compositions. Amino resins which are suitable for the purpose of this invention are the alkoxymethyl urea derivatives of for example urea, ethylene urea, and glycouril and the alkoxymethyl polyamino triazines selected from the group consisting of melamine, acetoguanamine, adipoguanamine, and benzoguanamine and the like.

The alkoxymethylureas can be prepared in the conventional manner by reaction of the urea compound and formaldehyde under alkaline conditions followed by etherification with a $C_1$ to $C_8$ alcohol or mixture of such alcohols under acid conditions to provide a condensate with an average degree of condensation of about 5 or less and a urea compound: formaldehyde: alcohol ratio in the range of about 1:1.5:1.25 to 1:4:4 provided that on average there are at least about 1.8 alkoxymethyl groups per molecule. Preferably the ratio is in the range of about 1:1.8:1.5 to 1:3.5:3.5.

The alkoxymethylaminotriazines are methylolated polyaminotriazines substantially etherified with an alcohol or mixture of alcohols. They can be prepared by reaction of the polyaminotriazine with formaldehyde to methylolate at least about half of the amino groups and are then alkylated or etherified by reaction with the alcohol. The etherified methylolated aminotriazines are liquid and are essentially monomeric or at most are oligomeric with an average degree of polymerization of no more than about 5, the aminotriazine rings being joined by methylene or methylene ether bridges formed by condensation of two methylol groups. Suitable etherified aminotriazines include those possessing a ratio of aminotriazine to combined formaldehyde in the range of about $1:(2n-3)$ to about $1:2n$ where n is the number of amino groups per triazine ring and a ratio of aminotriazine to alkyl ether groups in the range of about $1:(2n-3.5)$ to about $1:2n$ provided that on average there are at least about 1.8 alkoxymethyl groups per molecule. A preferred aminotriazine is melamine which is potentially hexafunctional. Thus, the more preferred aminotriazine compounds are the alkoxymethyl melamines in which the ratio of melamine to combined formaldehyde is in the range of 1:3 to 1:6 and the ratio of melamine to alkoxy groups is in the range of 1:2.5 to 1:6. The alcohols suitable for etherification of the methylol melamine are branched or straight chain $C_1$ to $C_8$ alcohols. A mixture of alcohols such as methanol and butanol or methanol and isobutyl alcohol (2-methyl-1-propanol) can be used for the etherification to make a mixed etherified amino resin. Preferred mixed ethers are methoxy/butoxy and methoxy/isobutoxy ethers. The range of the ratio of methoxy/butoxy or methoxy/isobutoxy can vary widely. A preferred range is from about 2:1 to about 1:2. A single alcohol can also be used for etherification. For such an application, the preferred alcohol is methanol.

THE FUNCTIONAL CO-REACTANT

The functional co-reactant which is used with the present invention can be one of a number of reactants which contain functional groups capable of reaction with the alkoxymethyl or methylol groups of the alkoxymethyl amino resin provided that such functional groups do not inhibit the free radical cure of the unsaturated components of the composition of the present invention. Such functional groups include hydroxy, carboxy, amide and activated methylene groups. Such functional co-reactants are of number average molecular weight in the range of about 60 to about 8000 and their functionality expressed as the number of functional groups per average molecule is in the range of about 2 to about 10. Advantageously, the functional co-reactants are resins of number average molecular weight in the range of about 300 to about 4000 selected from the group consisting of acrylic resins, alkyd resins and polyester resins.

FUNCTIONAL ACRYLIC RESINS

The acrylic resins are polymers of at least one ester of an alpha-olefinic monocarboxylic acid having the general formula:

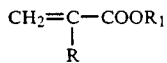

wherein R is either hydrogen or a lower alkyl group of from 1 to 4 carbon atoms, and $R_1$ represents an alkyl, hydroxy alkyl or cycloalkyl group of from 1 to 18 carbon atoms, and may include one or more of the comonomers of the formula:

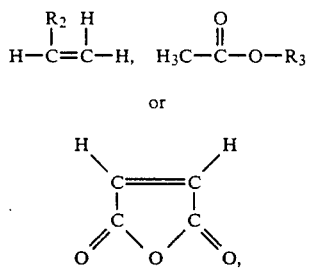

wherein $R_2$ is H, $CH_3$ or $C_6H_5$; and $R_3$ is alkene of 2 or 3 carbon atoms.

Examples of esters of alpha-olefinic monocarboxylic acids which may be used in the present invention include methyl acrylate, ethyl acrylate, propyl acrylate, isopropyl acrylate, butyl acrylate, hexyl acrylate, octyl acrylate, 2-ethylhexyl acrylate, cyclohexyl acrylate, decyl acrylate, stearyl acrylate, methyl methacrylate, methyl alpha-ethyl acrylate, ethyl methacrylate, butyl methacrylate, butyl alphaethyl acrylate, hydroxyethyl acrylate and methacrylate, hydroxypropyl acrylate and methacrylate and lauryl methacrylate.

Examples of the comonomers which may be used in the acrylics of the present invention are phenyl allyl alcohol, glycidyl methacrylate, styrene, α-methyl styrene, acrylic acid, methacrylic acid, acrylonitrile, maleic anhydride, allyl acetate and vinyl acetate.

When the functional acrylic resin is a hydroxy functional resin the hydroxy groups may be provided by comonomer units supplied by hydroxy functional monomers such as hyrdoxyalkyl (meth)-acrylates, allyl alcohol and methallyl alcohol. When the functional groups are acid groups, they may be supplied by copolymerizing with acrylic acid, methacrylic acid, maleic acid, fumaric acid and the like. When the functional groups are activated methylene groups, they may be supplied by means of an acetoacetyl functional monomer such as acetoacetoxyethyl (meth)-acrylate or a malonic acid diester such as vinyl ethyl malonate.

FUNCTIONAL ALKYD RESINS

The alkyd resins which can be used with the cross-linking composition of this invention include those types normally used in baking or air drying applications. These resins can contain up to about 45 weight percent of an oil or fatty acid. However, alkyd resins can be prepared which contain no fatty compound and are based upon polyols and polyacids only. These alkyd resins or oil-less alkyds are especially useful for exterior applications and provide a high degree of flexibility, adhesion, and elongation properties to the cured compositions of the present invention. Preferably, though, the fatty compound should be present in an amount equal to about 20 to about 45 weight percent of the total alkyd resin solids with the most preferable range being about 35 to 45 weight percent.

When a fatty compound is present in the alkyd resins of this invention, it can comprise any of the fatty acids or oils ordinarily used in preparing alkyd resins. Included are the following oils and their respectively derived fatty acids: tall, safflower, tung, tallow, soya, corn, linseed, poppyseed, castor, dehydrated castor, perilla, coconut, oiticica, and the like. Of special usefulness are those fatty compounds wherein the fatty acid portion contains from 12 to 24 carbon atoms per molecule.

An additional component of the alkyd resins of this invention is a polyol or a mixture of polyols. Among the polyols which can be utilized are those normally used in producing alkyd resins including pentaerythritol, glycerine, trimethyolpropane, trimethyolethane and the various glycols such as neopentyl, ethylene and propylene glycols. Preferable among the above types of polyols are triols or mixtures containing a major amount of a triol and a minor amount of tetra-alcohol.

Typical of the carboxylic acids in addition to the aforementioned fatty acids incorporated into the alkyd resins are phthalic anhydride, isophthalic acid, adipic acid, azelaic acid, benzoic acid, etc. These acids can readily be replaced by any of the additional acids normally used in alkyd resin processing. The preferred system in addition to including the aforementioned preferred levels of a fatty compound contains an aromatic dibasic acid or a mixture of such aromatic acid with an aliphatic dibasic acid.

In preparation of hydroxy or carboxy functional alkyds a suitable excess of polyol or polyacid is selected to provide the desired average molecular weight and hydroxy or carboxy functionality. In preparation of active methylene containing alkyds, a suitable hydroxy functional alkyd may be reacted with diketene or transesterified with methyl or ethyl acetoacetate or with dimethyl or diethyl malonate.

FUNCTIONAL POLYESTER RESIN

The polyester which can be used as a component of the composition of this invention may be saturated, unsaturated or oil-modified such as those polyesters well known in the surface coating art. Polyesters are prepared by reacting a polyhydric alcohol (polyol) and a polybasic acid.

Such polyols include ethylene glycol, propylene glycol, butylene glycol, diethylene glycol, dipropylene glycol, triethylene glycol, neopentyl glycol, trimethylene glycol, polyethylene glycol, polypropylene glycol, 1,5-pentanediol, trimethylolethane, trimethylolpropane, glycerol, 1,2,6-hexanetriol, pentaerythritol, sorbitol, mannitol, methyl glycoside, 2,2-bis(hydroxyethoxyphenyl) propane, 2,2-bis (beta-hydroxypropoxyphenyl) propane and the like. Mono-functional alcohols may also be employed to supplement the other polyols and to control the molecular weight. Useful alcohols include those having a hydrocarbon chain comprising from about 3 to about 18 carbon atoms.

The acid component of such polyesters may include unsaturated acids such as maleic acid, fumaric acid, itaconic acid, citraconic acid, glutaconic acid, mesaconic acid, and the like, and their corresponding anhydrides where such anhydrides exist. Other polycarboxylic acids which may be utilized in addition to the above-mentioned acids include saturated polycarboxylic acids such as succinic acid, glutaric acid, adipic acid, pimelic acid, suberic acid, azelaic acid, sebacic acid, and the like. Certain aromatic polycarboxylic acids and derivatives thereof may also be useful; for example, phthalic acid, tetrahydrophthalic acid, hexahydrophthalic acid, endomethylenetetrahydrophthalic anhydride, tetrachlorophthalic anhydride, hexachloroendomethylene tetrahydrophthalic acid, and the like. The term acid as used in this specification includes the corresponding anhydrides, where such anhydrides exist.

In many instances it is optional to include a fatty acid. These include saturated fatty acids such as decanoic, dodecanoic, tetradecanoic, hexadecanoic, octadecanoic, docosanoic, and the like. In addition, unsaturated fatty acids may be used such as 9-octadecenoic, 9,12-octadecadienoic, 9,12,15-octadecatrienoic, 9,11,13-octadecatrienoic, 4-keto-9,11,13-octadecatrienoic, 12-hydroxy-9-octadecenoic, 13-docosenoic, and the like.

In preparation of hydroxy or carboxy functional polyesters a suitable excess of polyol or polyacid is selected to provide the desired average molecular weight and hydroxy or carboxy functionality. In preparation of active methylene containing polyesters, a suitable hydroxy functional alkyd may be reacted with diketene or transesterified with methyl or ethyl acetoacetate or with dimethyl or diethyl malonate.

THE (METH)-ACRYLOYL COMPOSITION

The (meth)-acryloyl composition useful in the curable compositions of the present invention can be an unsaturated monomer or oligomer or mixture of monomers and oligomers. The nature of the compound is not critical so long as it is activated towards free radical polymerization via the double bonds when it is brought into reactive admixture with a free-radical initiator in a substantially oxygen free environment. Suitable (meth)-acryloyl compositions advantageously have a number average molecular weight less than about 4000 and contain from 1 to about 10 unsaturated groups per molecule. A particularly preferred group of (meth)-acryloyl monomers is represented by the structure:

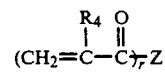

where $R_4$ is selected from the group consisting of H, $CH_3$ and $C_2H_5$, where r is an integer in the range of 1 to 10 and Z is a saturated or ethylenically unsaturated residue of an alcohol or polyol, a carboxylic acid or poly carboxylic acid, an amine or a polyamine, an epoxide or polyepoxide or an isocyanate or polyisocyanate or a methylol or polymethylol amino resin of a number average molecular weight less than about 4000 containing a hydrocarbon, ester, amide, ether urethane or amino resin backbone. Such monomers may be obtained by reaction of acryloyl or methacryloyl chloride with an alcohol, a polyol, an amine, or a polyamine or by the reaction of acrylic acid, methacrylic acid, acrylamide or methacrylamide with an epoxide, a polyepoxide, an isocyanate, or a polyisocyanate, or by reaction of a hydroxyalkyl acrylate or methacrylate with a carboxylic acid, polycarboxylic acid, an epoxide, a polyepoxide, an isocyanate, a polyisocyanate, a methylol amino resin, a polymethylol amino resin, a methoxymethyl amino resin or a polymethoxymethyl amino resin. Such (meth)-acryloyl compositions include methyl acrylate, methyl methacrylate, butyl acrylate, 1,3-butylene glycol diacrylate, 1,6-hexanediol diacrylate, the polyacrylates and polymethacrylates of polyethylene glycols and polyols, polypropylene glycols and polyols and poly(tetramethylene glycols) and poly(tetramethylene) polyols of molecular weight in the range of 100 to 4000, pentaerythritol tetracrylate, trimethylolpropane triacrylate, dipentaerythritol monohydroxypentacrylate, ethoxylated bisphenol A dimethacrylate, the diacrylates, dimethacrylates and diethacrylates of epoxy compounds formed from bisphenol A and epichlorohydrin of molecular weight in the range of 200 to 4000, the polyacryloyl monomers prepared by reacting isocyanate capped polyethers and isocyanate capped polyesters of molecular weight up to 4000 with hydroxyethyl (meth)-acrylate, and the polyacryloyl monomers prepared by reacting (meth)-acrylic acid (meth)-acrylamide or hydroxyethyl (meth)-acrylate with polymethoxyalkyl amino resins such as hexamethoxymethyl melamine.

The compositions of the present invention may be used in adhesive and surface coating applications, and in the preparation of prepregs and laminates comprising suitable reinforcing agents such as glass fiber scrim and cloth. Advantageously the compositions may be diluted with solvent to provide suitable coating or impregnation viscosity. The proportions of the curable ingredients of the composition can vary widely depending on the compatibility of the major ingredients and the end use of the cured composition. The major ingredients are advantageously selected to be compatible with one another to avoid impairment of gloss and clarity of the cured compositions. Compatibility is readily determined by mixing the major ingredients and determining the range of mixtures which do not separate into phases or form cloudy solutions or cloudy coatings when the composition is applied as a thin coating to a glass sheet.

Provided that the curable components are suitably compatible, the compositions may comprise any ratio of components that will provide a desired degree of cure or hardness in the cured composition. Advantageously the alkoxymethyl amino resin and functional co-reactant provide at least about 25 weight percent of the curable components of the composition and can provide as much as ninety percent. The ratio of alkoxymethyl amino resin to functional co-reactant is generally in the range of about 1:4 to about 4:1 parts by weight.

In order to achieve low temperature curing with the compositions of the present invention an acid catalyst can be used. Included are catalysts such as para-toluenesulfonic acid, dodecylbenzene sulfonic acid, methanesulfonic acid dinonylnaphthalene sulfonic acid, dinonylnaphthalene disulfonic acid, butyl acid phosphate, hydrochloric acid, and other organic and mineral acids having at least one active hydrogen group per molecule. Preferred among these catalysts are the sulfonic acids. Advantageously the sulfonic acid catalysts can be blocked with a conventional blocking agent such as an epoxy functional compound to inhibit cure at ambient temperatures. Suitable cure temperatures can be selected in the temperature range of about 65° to 225° C. with cure times in the range of about five minutes or less to 3 hours or more depending upon the temperature and catalyst concentration. Catalyst concentration can range from about 0.25 to about 6 weight percent of the composition.

In order to accelerate cure of the (meth)acryloyl component of the compositions of the present invention, a free radical initiator may be added. Such free radical initiator is selected to provide an adequate rate of decomposition and free radical generation at the cure temperature of the composition and can be selected from the group consisting of t-butyl hydroperoxide, cumene peroxide, methyl ethyl ketone peroxide, lauroyl peroxide, benzoyl peroxide, 2,5-dihydroperoxy-2,5-dimethylhexane, azo-bis (isobutyronitrile) and the like. Advantageously the concentration of free-radical generating compound is selected within the range of 0.1 to 5 parts by weight of the component reactants and preferably within the range of 0.3 to 3 parts for 100 parts by weight of the component reactants.

Depending on the end use and the application requirements it may be convenient to add any of the other conventional additives for curable compositions such as pigments, fillers, reinforcing agents, stabilizers, inhibitors and flow control agents.

In those cases where it may be desirable to provide solvent (or vehicle) for the curable composition of this invention, such solvent is preferably a volatile organic compound comprising a ketone, such as acetone, methyl ethyl ketone, methyl isobutyl ketone, etc.; an ester such as ethylene glycol monoethyl ether acetate; an aromatic such as toluene, xylene; or a mixture thereof.

It can be advantageous to incorporate the (meth)-acryloyl functionality into the functional co-reactant or into the alkoxymethyl amino resin with the purpose of obtaining a wider range of compatibility of the ingredients of the curable composition of the present invention. In this regard some or all of the functional co-reactant and some or all of the (meth)-acryloyl component can be replaced with a functional (meth)-acryloyl component. Included among such functional (meth)-acryloyl components are hydroxy functional (meth)-acryloyl components such as trimethylolpropane di(meth)-acrylate, pentaerythritol di(meth)-acrylate, pentaerythritol tri(meth)-acrylate, dipentaerythritol (meth)-acrylates containing from 1 to 5 (meth)-acrylate groups, hydroxyethyl (meth)-acrylate, the reaction products of (meth)-acrylic acid or (meth)-acrylamide with polyepoxides, and the products obtained by partial esterification of hydroxy functional poly(meth)-acrylates and polyesters with (meth)-acrylic acid. Also included among such functional (meth)acryloyl components are carboxy functional (meth)-acryloyl components such as the products obtained by partial esterification of carboxy functional poly(meth)-acrylates and polyesters with hydroxyalkyl (meth)-acrylates such as hydroxyethyl (meth)-acrylates. Also included are (meth)-acryloyl components containing active methylene groups such as the products of trans-esterificiation of hydroxy functional (meth)-acryloyl compounds with ethylacetoacetate. Further in this regard, some or all of the (meth)-acryloyl component and some or all of the alkoxymethyl amino resin may be replaced with a (meth)-acryloyl functional alkoxymethyl amino resin. Included among such (meth)-acryloyl functional alkoxymethyl amino resins are the reaction products of (meth)-acrylic acid, (meth)-acrylamide or hydroxyalkyl (meth)-acrylates such as hyroxyethyl (meth)-acrylate with the alkoxymethyl amino resins described hereinabove, to provide (meth)-acryloyl functional alkoxymethyl amino resins comprising at least one (meth)-acryloyl group and at least one alkoxymethyl group per average molecule.

In general the ratio of reactants selected for the compositions of the present invention is any ratio which provides compositions capable of being cured to a desired degree of hardness. A satisfactory level of hardness for a coating is a knoop hardness rating of at least 4 and more preferably a rating of at least 6. Suitable compositions may contain per 100 parts by weight of the reactants present in the composition from about 0.03 to about 0.22 equivalents of functional groups reactive with alkoxymethyl groups, from about 0.05 to about 0.40 equivalents of alkoxymethyl groups and from about 0.10 to about 0.60 equivalents of (meth)-acryloyl groups, the ratio of functional groups reactive with the alkoxymethyl groups to alkoxymethyl groups being in the range of about 0.25 to about 2.5. Preferred compositions contain per 100 parts by weight of the reactants present in the composition, from about 0.08 to about 0.18 equivalents of functional groups reactive with alkoxymethyl groups, from about 0.08 to about 0.30 equivalents of alkoxymethyl groups and from about 0.15 to about 0.50 equivalents of (meth)-acryloyl groups.

Since the curable composition of the present composition may gel within days or even within hours of being formulated, it can be convenient to provide the composition as a two component pack to be mixed immediately prior to use either batch-wise or continuously by means of a two component mixer-applicator or spray gun. When the composition is provided as a two component pack, it is advantageous to provide the free-radical initiator in the first component comprising the amino resin and the functional co-reactant and to provide the acid catalyst in the second component containing the (meth)-acryloyl composition. In systems in which the (meth)-acryloyl groups are incorporated into the amino resin, the free-radical initiator and the acid catalyst are added to functional co-reactant and in systems in which the (meth)acryloyl groups are incorporated into the functional co-reactant, the free-radical initiator is added to the amino resin component and the acid catalyst is added to the functional co-reactant.

The application of the curable composition of the present invention as a coating to a substrate may be executed by a conventional method. That is, the composition may be applied by brushing, roller coating, spraying with compressed air or with a petroleum solvent of low boiling point or electrostatic spraying.

The composition may be applied as a coating to a variety of materials such as wood, paper, paper board, glass, metal, stone, plastics and cloth.

Practical and presently preferred embodiments of the present invention are shown for illustration in the following Examples wherein parts and percentages ar by weight unless otherwise indicated.

EVALUATION OF CURED COMPOSITIONS

Solvent resistance of the cured composition is measured by rubbing the coating with felt tip pen soaked with methyl ethyl ketone and is stated as the number of double rubs which are required to break through the coating.

Gloss is measured at 60° and 20° according to ASTM-D573. Results are given in percent (%) for the two angles.

Tukon hardness is measured according to ASTM-D1474. The values are in Knoop hardness units.

Acid etch resistance is determined with two solutions. Solution A consists of an aqueous solution containing 46.5 percent formic acid, 2.5 percent tannic acid and 1 percent honey. Solution B consists of an aqueous solution comprising 23.5 percent formic acid, 12 percent tannic acid, 12 percent honey and 0.5 percent albumen. Drops of the solutions are applied to test coatings which are then subjected to a temperature of 60° C. for 30 minutes. The coatings are then graded in acid etch resistance according to the following scale:

5 - no change,
4 - slight discoloration,
3 - softening, slight staining,
2 - softening, pronounced staining,
1 - pronounced softening and staining,
0 - coating failure.

EXAMPLE 1

Thirty (30) parts by weight of a hydroxy functional polyacrylate of number average molecular weight 1300 and hydroxyl number 140, 20 parts by weight of a butoxy methoxymethylmelamine (D.P.=1.4, melamine: formaldehyde:methanol:butanol, 1:5.6:2.8:2.1), 25 parts by weight of an acryloyl polyester of number average molecular weight 540 and acryloyl functionality 2 sold by Nippon Kayoko KK, under the tradename Kayrad HX-220, 25 parts by weight of Sartomer SR-399 (dipentaerythritol penta-acrylate (DPPA)), 0.4 parts by weight of a surface active agent, a polysiloxane copolymer, sold by BYK Chemie under the tradename BYK-341 and 0.4 parts by weight of dodecylbenzene sulfonic acid are mixed thoroughly and coated on a metal panel to provide a dry film 50 microns thick. The coating is cured for 30 minutes at 120° C. The film has a Tukon hardness of 4.0 and a solvent resistance of 50.

EXAMPLES 2 AND 3

Example 1 is repeated in Examples 2 and 3 with 1 and 3 weight percent of benzoyl peroxide added to the respective examples. The Tukon hardness of the cured films are 6.0 and 11.0 respectively and the solvent resistances are 75 and more than 100.

EXAMPLE 4

Example 3 is repeated as a two-package system. The first package contains the methoxymethyl melamine and the benzoyl peroxide and the second package contains the hydroxy functional polyester, the acryloyl components and the dodecylbenzene sulfonic acid. The two packages are storage stable. Upon mixing, applying the mixture as a coating to a panel, and curing the coating at 120° C. for 30 minutes, a coating of Tukon hardness greater than 10 and a solvent resistance greater than 100 is obtained.

EXAMPLES 5-7 and COMPARATIVE EXAMPLES C1, C2

Example 3 is repeated with different ratios of reactants and containing one part by weight FC 430, a flow control agent in place of BYH-341, and 4 parts by weight of an epoxy blocked dodecylbenzene-sulfuric acid solution containing 20 weight percent acid and diluted with xylene to provide suitable coating viscosity. The xylene solutions are coated and cured at 120° C. for 30 minutes. Data are presented in Table 1.

TABLE 1

| Ex. | Hydroxy Func. Polyacrylate | Butoxy Methoxy Methyl Melamine | DPPA | Kayrad HX-220 | Tukon Hardness | Solv. Resist. | Acid Etch Resist. | Gloss 60°/20° |
|---|---|---|---|---|---|---|---|---|
| 5 | 24 | 16 | 30 | 10 | 15.5 | >100 | good | 95/88 |
| 6 | 12 | 8 | 30 | 30 | 9.8 | >100 | good | 87/82 |
| 7 | 36 | 24 | 10 | 10 | 9.5 | >100 | poor | 94/89 |
| C1 | 60 | 40 | — | — | 8.4 | >100 | poor | 95/91 |
| C2 | — | — | 50 | 50 | 8.2 | >100 | good | 89/81 |

What is claimed is:

1. A thermally activated curable composition comprising an alkoxymethyl amino resin component, a hydroxy-functional component co-reactive with the alkoxymethyl amino resin, a (meth)-acryloyl component, an acid catalyst to catalyze the condensation of the alkoxymethyl amino resin component and the functional co-reactive component, and a free radical generating compound, wherein the functional co-reactive component is of number average molecular weight in the range of about 60 to about 8000 and wherein the functionality of the hydroxy-functional co-reactive component is in the range of about 2 to about 10.

2. The composition of claim 1 wherein per 100 parts by weight of the components, the concentration of alkoxymethyl groups is in the range of about 0.05 to about 0.40 equivalents, the concentration of functional groups reactive with the alkoxymethyl groups is in the range of about 0.03 to about 0.22 equivalents, the concentration of (meth)-acryloyl groups is in the range of about 0.10 to about 0.60 equivalents, the ratio of functional groups reactive with alkoxymethylamino groups to alkoxymethylamino groups is in the range of about 0.25 to about 2.5, wherein the alkoxymethyl amino resin and the functional co-reactant provide from 25 to 90 parts by weight and wherein the ratio of alkoxymethyl amino resin to functional co-reactant is in the range of 1:4 to 4:1 parts by weight.

3. The composition of claim 1 wherein the acid catalyst is a blocked sulfonic acid catalyst.

4. The composition of claim 1 wherein the free-radical generating compound is selected from the group consisting of t-butyl hydroperoxide, cumene hydroperoxide, cumene peroxide, methyl ethyl ketone peroxide, lauroyl peroxide, benzoyl peroxide, 2,5-dihydroperoxy-2,5-dimethylhexane and azo-bis (isobutyronitrile).

5. The composition of claim 2 wherein the (meth)-acryloyl composition is represented by the formula:

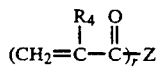

where $R_4$ is selected from the group consisting of H, $CH_3$ and $C_2H_5$ where r is an integer in the range of 1 to 10 and Z is a saturated or ethylenically unsaturated residue of an alcohol, a polyol, a carboxylic acid, a poly-carboxylic acid, an amine, a polyamine, an aminotriazine, an epoxide, a polyepoxide, an isocyanate or a polyisocyanate of a number average molecular weight less than about 4000 containing a hydrocarbon, ester, amide, ether, urethane or triazine nucleus.

6. The composition of claim 5 wherein the acid catalyst is a blocked sulfonic acid catalyst present in a heat-activated cure-rate-enhancing amount.

7. The composition of claim 5 wherein the alkoxymethyl amino resin is an alkoxymethyl urea or an alkoxymethyl aminotriazine of average degree of condensation of about 5 or less, containing at least 1.8 alkoxymethyl groups per molecule, derived from a urea, or an aminotriazine, formaldehyde and a C1 to C8 alcohol, wherein the urea: formaldehyde: alcohol ratio is from about 1:1.5:1.25 to 1:4:4 and wherein the aminotriazine:formaldehyde:alcohol ratio is from about 1:2n−3:2n−3.5 to 1:2n:2n where n is the number of amino groups per triazine ring, and wherein the functional co-reactant is selected from the group consisting of poly(meth)-acrylates, alkyds and polyesters.

8. The composition of claim 7 wherein the alkoxymethylamino resin is an alkoxymethyl melamine.

9. A thermally activated curable composition comprising:
(A) A first package comprising an alkoxymethyl amino resin component and a free-radical generating compound; and
(B) a second package comprising a hydroxy-functional component co-reactive with the alkoxymethyl amino resin, a (meth)-acryloyl component and an acid catalyst, wherein the hydroxy-functional co-reactive component is of number average molecular weight in the range of about 60 to about 8000, and wherein the functionality of the hydroxy-functional co-reactive component is in the range of about 2 to about 10.

10. The curable composition of claim 9 wherein per 100 parts by weight of the components, the concentration of alkoxymethyl groups is in the range of about 0.05 to about 0.40 equivalents, the concentration of functional groups reactive with the alkoxymethyl groups is in the range of about 0.03 to about 0.22 equivalents, the concentration of (meth)-acryloyl groups is in the range of about 0.10 to about 0.60 equivalents, the ratio of functional groups reactive with alkoxymethylamino groups to alkoxymethylamino groups is in the range of about 0.25 to about 2.5, and wherein the alkoxymethyl amino resin and the functional co-reactant provide form 25 to 90 parts by weight per 100 parts by weight of the components.

11. The curable composition of claim 10 wherein the free-radical generating compound is selected from the group consisting of t-butyl hydroperoxide, cumene hydroperoxide, cumene peroxide, methyl ethyl ketone peroxide, lauroyl peroxide, benzoyl peroxide, 2,5-dihydroperoxy-2,5-dimethylhexane and azo-bis (isobutyronitrile).

12. The curable composition of claim 10 wherein the (meth)-acryloyl component is represented by the formula

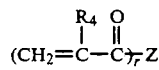

where $R_4$ is selected from the group consisting of H, $CH_3$ and $C_2H_5$, where r is an integer in the range of 1 to 10 and Z is a saturated or ethylenically unsaturated residue of an alcohol, a polyol, a carboxylic acid, a poly-carboxylic acid, an amine, a polyamine, an aminotriazine, an epoxide, a polyepoxide, an isocyanate or a polyisocyanate of a number average molecular weight less than about 4000 containing a hydrocarbon, ester, amide, ether, urethane or triazine nucleus 13. The composition of claim 10 wherein the alkoxymethyl amino resin is an alkoxymethyl urea or an alkoxymethyl aminotriazine of average degree of condensation of about 5 or less, containing at least 1.8 alkoxymethyl groups per molecule derived from a urea or an aminotriazine, formaldehyde and a C1 to C8 alcohol, wherein the urea: formaldehyde: alcohol ratio is from about 1:1.5:1.25 to 1:4:4 and wherein the aminotriazine:formaldehyde: alcohol ratio is from about 1:2n−3:2n−3.5 to 1:2n:2n where n is the number of amino groups per triazine ring, and wherein the functional co-reactant is a polyfunctional resin of number average molecular weight in the range of from about 300 to about 4000 selected from the group consisting of poly(meth)-acrylates, alkyds and polyesters.

14. The curable composition of claim 13 wherein the alkoxymethyl amino resin is an alkoxymethyl melamine.

15. A thermally activated curable composition comprising:
(A) a first package comprising an alkoxymethyl amino resin component and a (meth)-acryloyl component; and
(B) a second package comprising a hydroxy-functional component co-reactive with the alkoxymethyl amino resin, an acid catalyst and a free-radical generating compound, wherein the functional co-reactive component is of number average molecular weight in the range of about 60 to about 8000, and wherein the functionality of the functional co-reactive component is in the range of about 2 to about 10.

16. The curable composition of claim 15 wherein, per 100 parts by weight of the components the concentration of alkoxymethyl groups is in the range of about 0.05 to about 0.40 equivalents, the concentration of functional groups reactive with the alkoxymethyl groups is in the range of about 0.03 to about 0.22 equivalents, the concentration of (meth)-acryloyl groups is in the range of about 0.10 to about 0.60 equivalents, the ratio of functional groups reactive with alkoxymethylamino groups to alkoxymethylamino groups is in the range of about 0.25 to about 2.5, and wherein the alkoxymethyl amino resin and the functional co-reactant provide from 25 to 90 parts by weight per 100 parts by weight of the components.

17. The curable composition of claim 16 wherein the free-radical generating compound is selected from the group consisting of t-butyl hydroperoxide, cumene hydroperoxide, cumene peroxide, methyl ethyl ketone peroxide, lauroyl peroxide, benzoyl peroxide, 2,5-dihydroperoxy-2,5-dimethylhexane and azo-bis(isobutyronitrile).

18. The curable composition of claim 17 wherein the (meth)-acryloyl component is represented by the formula:

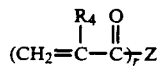

where $R_4$ is selected from the group consisting of H, $CH_3$ and $C_2H_5$, where r is an integer in the range of 1 to 10 and Z is a saturated or ethylenically unsaturated residue of an alcohol, a polyol, a carboxylic acid, a polycarboxylic acid, an amine, a polyamine, an aminotrizina, an epoxide, a polyepoxide, an isocyanate or a polyisocyanate of a number average molecular weight less than about 4000 containing a hydrocarbon, ester, amide, ether, urethane or triazine nucleus.

19. The composition of claim 18 wherein the alkoxymethyl amino resin is an alkoxymethyl urea or an alkoxymethyl aminotriazine of average degree of condensation of about 5 or less, containing at least 1.8 alkoxymethyl groups per molecule, derived from a urea, or an aminotriazine, formaldehyde and a C1 to C8 alcohol, wherein the urea: formaldehyde: alcohol ratio is from about 1:1.5:1.25 to 1:4:4 and wherein the aminotriazine: formaldehyde:alcohol ratio is from about 1:2n−3:2n−3.5 to 1:2n:2n where n is the number of amino groups per triazine ring, and wherein the functional co-reactant is a polyfunctional resin of number average molecular weight in the range of from about 300 to about 4000 selected from the group consisting of poly(meth)acrylates, alkyds and polyesters.

20. The curable composition of claim 19 wherein the alkoxymethyl amino resin is an alkoxymethyl melamine.

21. The composition of claim 8 wherein the alkoxymethyl groups are selected from the group consisting of methyl, butyl and iso-butyl.

* * * * *